United States Patent [19]

Mizogami et al.

[11] 4,308,170

[45] Dec. 29, 1981

[54] TITANIUM CATALYST FOR THE POLYMERIZATION OF OLEFINS

[75] Inventors: Shigeyoshi Mizogami; Satoshi Asahi; Yasuhiro Takeshita, all of Sodegaura, Japan

[73] Assignee: Idemitsu Kosan Co., Ltd., Tokyo, Japan

[21] Appl. No.: 165,096

[22] Filed: Jul. 1, 1980

[30] Foreign Application Priority Data

Jul. 5, 1979 [JP] Japan .................. 54-84416

[51] Int. Cl.³ ............................................... C08F 4/64
[52] U.S. Cl. ................................. 252/429 B; 526/125
[58] Field of Search .................... 252/429 B, 431 R

[56] References Cited

U.S. PATENT DOCUMENTS

| | | | |
|---|---|---|---|
| 4,071,674 | 1/1978 | Kashiwa et al. | 252/429 B X |
| 4,238,354 | 12/1980 | Dietz | 252/429 B |
| 4,240,929 | 12/1980 | Dietz et al. | 252/429 B |
| 4,243,552 | 1/1981 | Welch et al. | 252/429 B |

*Primary Examiner*—Patrick Garvin
*Attorney, Agent, or Firm*—Frishauf, Holtz, Goodman & Woodward

[57] ABSTRACT

A process for producing an improved titanium catalyst for use in the polymerization of olefins comprising heating a magnesium dialkoxide and an alcohol adduct of a magnesium dihalide to form a solid product, treating said solid product with an alcohol to form an alcohol treated solid product, and then reacting said alcohol treated solid product with a halogen-containing titanium compound. The reaction product of said alcohol treated solid product with the halogen-containing titanium compound may optionally be reacted with an organoaluminum compound. The products of the processes described in the preceding two sentences is an improved titanium catalyst which is generally used with an organoaluminum olefin polymerization cocatalyst.

6 Claims, No Drawings

TITANIUM CATALYST FOR THE POLYMERIZATION OF OLEFINS

BACKGROUND OF THE INVENTION

This invention relates to the production of an improved titanium catalyst for use in the polymerization of olefins and more particularly to a process for efficiently producing a titanium catalyst component of high activity which is used in combination with an organoaluminum compound to produce olefin polymers, and to the polymerication process.

The reaction of a magnesium compound, e.g., magnesium halide and magnesium alkoxide, as a catalyst carrier and titanium halide results in the formation of a highly active catalyst component for the polymerization of olefins, e.g., ethylene, see, for example, Japanese Patent Publication Nos. 34098/1971 and 34092/1971. Such a catalyst component has insufficient catalytic activity and the polyolefin obtained by using the catalyst component is not of satisfactory quality.

In the highly active polymerization of an olefin such as ethylene, it is preferred to omit the catalyst-removal step and simplify the production process by increasing the activity of the catalyst and reducing the amount of the carrier by increasing the productivity per unit of the carrier. Moreover, in order to simplify handling of the slurry during the production of polyolefin, it is desired that the bulk density of the polymer product should be as large as possible, the grain size of the polymer powder should be uniform and the amount of fine particles in the powder should be small.

The Invention

It has now been discovered that a magnesium compound obtained by a specific treatment when used as a catalyst carrier with a titanium component is an improved catalyst for olefin polymerization.

The invention provides a process for the production of a titanium catalyst component for use in the polymerization of olefins which process comprises heat-treating magnesium dialkoxide and an alcohol adduct of magnesium dihalide to provide a solid product, treating the solid product with alcohol and then reacting the thus treated solid product with a halogen-containing titanium compound.

The magnesium dialkoxides are usually those represented by the formula $Mg(OR^1)_2$ wherein $R^1$ is an alkyl group, a cycloalkyl group, an arylalkyl group, or the like, each containing 1 to 20 carbon atoms, preferably 1 to 10 carbon atoms. Suitable examples are magnesium dimethoxide, magnesium diethoxide, magnesium dipropoxide, magnesium dibutoxide, magnesium dicyclohexoxide, etc. The preferred average grain size of the magnesium dialkoxide used in the present invention is from 1 $\mu$ to 500 $\mu$.

While the magnesium dialkoxides on the market can be used, the one produced by the reaction of metallic magnesium and alcohol may be used.

The alcohol adduct of magnesium dihalide which is heat-treated together with the above-described magnesium dialkoxide is represented by the formula $MgX_2 \cdot nR^2OH$ wherein X is a halogen atom, e.g., chlorine, bromine, iodine, etc., and $R^2OH$ is a straight or branched chain aliphatic or alicyclic alcohol, preferably a primary or secondary alcohol containing 1 to 10 carbon atoms, and n is usually in the range of 0.1 to 10.

Representative examples of the alcohol adducts represented by the formula $MgX_2 \cdot nR^2OH$ are $MgCl_2 \cdot 6C_2H_5OH$ and the like.

In the heat-treatment of magnesium dialkoxide and the alcohol adduct of magnesium dihalide, they are preferably mixed in a molar ratio of the magnesium dialkoxide to the alcohol adduct of 1:4 to 4:1 and treated by heating at a temperature of from 100° C. to 200° C. under reduced pressure for a period of about 3 hours to about 10 hours to produce a solid product. In this heat-treatment, a very small amount of alcohol (about 1 milliliter per gram of the above mixture) can be added to the system. Said alcohol may be the same alcohol or a different alcohol than the alcohol added in the alcohol treatment described hereinafter.

Then the solid product obtained by the aforedescribed heat-treatment is treated with an alcohol. Alcohols which can be used in this alcohol treatment are straight or branched chain aliphatic or alicyclic alcohols, preferably primary or secondary alcohols containing 1 to 10 (and preferably at least 3) carbon atoms. Representative examples are methanol, ethanol, propanol, isopropanol, butanol, isobutanol, amyl alcohol, octanol and the like.

The amount of the alcohol for use in the alcohol treatment is subject to no limitations and can appropriately be determined depending upon various conditions. It is usually from 0.1 mole to 10 moles, preferably 1 mole per mole of magnesium in the solid product obtained by the aforedescribed heat-treatment.

The temperature and time for the alcohol-treatment can appropriately be determined. In general, the alcohol treatment is carried out for from 5 minutes to 5 hours at 0° C. to 200° C. and preferably for 20 minutes to 3 hours at 20° C. to 100° C.

After the alcohol treatment, the solid product of said treatment is reacted with a halogen-containing titanium compound. The halogen-containing titanium compounds which can be used in this reaction are those represented by the formula $Ti(OR^3)_{4-m}X_m$ wherein X is a halogen atom, $R^3$ is an alkyl group containing 1 to 10 carbon atoms, and m is an integer of 1 to 4. Representative examples are $TiCl_4$, $TiBr_4$, $CH_3OTiCl_3$, $C_2H_5OTiCl_3$, $C_3H_7OTiCl_3$, $(C_2H_5O)_2TiCl_2$, $(C_2H_5O)_3TiCl$, etc.

The amount of the halogen-containing titanium compound which is used varies depending upon the conditions. It is usually within the range of from 0.5 mole to 10 moles per mole of magnesium in the product.

The reaction of the alcohol treated solid product and the halogen-containing titanium compound is generally carried out in an inert hydrocarbon solvent, such as pentane, hexane, heptane, cyclohexane or the like, at a temperature of from 0° C. to 200° C., preferably from 50° C. to 150° C. for a period of from 5 minutes to 10 hours, preferably from 30 minutes to 5 hours.

After the reaction is completed, the reaction product is washed to obtain the desired titanium catalyst component. This titanium catalyst component may be used as it is as an olefin polymerization catalyst. However, reduction processing of the titanium catalyst component with an organoaluminum compound represented by the formula $AlR_nX_{3-n}$ wherein R is an alkyl group, X is a halogen atom, and n is an integer of 1 to 2 increases the activity of the titanium catalyst component. This organoaluminum compound may be the same or different than the organoaluminum compound which is the other component of the olefin polymerization catalyst as described hereinafter.

The thus obtained titanium catalyst component can be used in combination with the organoaluminum compound as the catalyst for the polymerization of olefins.

In the polymerization of an olefin such as ethylene and propylene, a dispersion of the titanium catalyst component of this invention and the organoaluminum compound are placed as the catalyst in the reaction system in which the olefin is then introduced. The polymerization method, polymerization conditions, etc., are not limited. The polymerization of olefins using the titanium catalyst component of the present invention can be carried out in all types of solution polymerization, suspension polymerization, gas phase polymerization, etc., and in either continuous or discontinuous polymerization.

With regard to the amounts of the catalyst components added in solution polymerization or suspension polymerization, the titanium catalyst component is added in an amount of 0.001 to 10 millimoles/liter as a titanium atom, and the organoaluminum compound is added in such an amount that Al/Ti (atomic ratio) is from 5 to 1000, preferably 10 to 200. While the pressure of olefin in the reaction system varies depending upon the specific olefin which is used, it is usually controlled within the range of 2 to 50 atmospheric pressure. The reaction temperature is from 0° C. to 200° C., preferably from 50° C. to 150° C. The reaction time is from 10 minutes to 5 hours, preferably from 30 minutes to 3 hours. The molecular weight of the olefin polymer can be controlled or modified by conventional methods, for example, by addition of hydrogen.

Representative examples of the organoaluminum compounds are trialkylaluminum compounds such as trimethylaluminum, triethylaluminum, triisopropylaluminum, triisobutylaluminum and trioctylaluminum; and dialkylaluminum monohalides such as diethylaluminum monochloride, diisopropylaluminum monochloride, diisobutylaluminum monochloride and dioctylaluminum monochloride.

Olefin polymers which are obtained by use of the titanium catalyst component of this invention include homopolymers of $\alpha$-olefins such as ethylene, propylene, 1-butene and 1-hexene and copolymers of such olefins and a small amount of another $\alpha$-olefin. In the polymerization of propylene, the addition of esters, such as methyl p-toluate and ethyl benzoate to the reaction system improves the isotacticity of the polypropylene product.

Since the titanium catalyst component obtained by this invention has very high activity, sufficient catalytic effect can be obtained by the use of the titanium catalyst component in a very small amount. Consequently, it is possible to omit the de-ashing step (catalyst removal step). Furthermore, the amount of the carrier used per the amount of the polyolefin produced and the number of the preparation of catalyst can be markedly reduced in comparison with the conventional methods. Moreover, with regard to the polyolefin product such as polyethylene, polypropylene, etc., the bulk density is high and the distribution of grain size is satisfactory. Therefore, the polyolefin powder product is easy to handle.

The following examples are given to illustrate this invention in greater detail.

EXAMPLE 1

Production of Solid Catalyst (1) Production of Solid Product as Carrier

To 10.4 grams (91 millimoles) of $Mg(OC_2H_5)_2$ with an average grain size of $10\mu$ which had been prepared by pulverization in a ball mill was added 33.7 grams (91 millimoles) of $MgCl_2.6C_2H_5OH$ which had been prepared by dissolving $MgCl_2$ in an excess of ethanol followed by distilling off the ethanol. To this mixture was added a small amount (about 40 milliliters) of ethanol, and the resulting mixture was kneaded and then transferred to a flask where it was heated-treated at 160° C. for 4 hours under reduced pressure. The thus obtained solids were pulverized to product the solid product for use as a carrier.

(2) Alcohol-treatment of Solid Product

In a 500 milliliters volume flask was placed 100 milliliters of hexane in which 5 grams (48 millimoles as Mg) of the above obtained solid product was suspended. To this suspension was added 2.9 grams (48 millimoles) of isopropanol, and they were reacted at 70° C. for 1 hour.

(3) Production of Solid Catalyst Carrying Deposited Titanium Component

After the alcohol-treatment, 23 grams of $TiCl_4$ were dropwise added to the above treated solid product at 70° C. within the period of 1 hour, and they were further reacted at 70° C. for 3 hours. After the reaction was completed, the temperature was lowered to room temperature and the supernatant solution was removed by decantation. The residue was then washed by adding 150 milliliters of hexane. This operation was repeated until no Cl ions were detected in hexane as the washing liquid. Thereafter, 300 milliliters of fresh hexane was added to give a catalyst suspension. The amount of the titanium deposited on the solid product was measured by the colorimetric method and found to be 290 milligrams of Ti per gram of solid product as carrier.

Polymerization of Ethylene

In a dried 1-liter volume stainless steel autoclave was placed 400 milliliters of hexane. A mixture of 2 millimoles of triethylaluminum and 0.01 millimole (as Ti) of the solid catalyst as obtained above was introduced in the autoclave and the temperature was raised to 80° C. Hydrogen was introduced until the hydrogen pressure reached 3 kg/cm² Gage, and the ethylene pressure was maintained at 5 kg/cm² Gage (total pressure 9.5 kg/cm². Gage). By continuously introducing ethylene in the autoclave, the total pressure was kept constant, and the polymerization was conducted at 80° C. for 1 hour. As a result, 115 grams of polyethylene was obtained.

The catalyst activity was 240 kilograms of polyethylene per 1 gram of titanium per 1 hour, and the productivity was 69.6 kilograms/gram-solid product per hour. The bulk density was as high as 0.34 gram/cubic centimeter and fine powders with a grain size of $105\mu$ or less constitute only 9.0% of the total weight. The melt index was 2.2 grams/10 minutes.

Comparative Example 1

Production of Solid Catalyst Carrying Deposited Titanium Component

In the same manner as in Example 1 except that the alcohol adduct was not used, $Mg(OC_2H_5)_2$ as the carrier was subjected to the alcohol treatment using an equimolar amount of isopropanol and reacted with $TiCl_4$ to obtain a solid catalyst. The amount of the titanium deposited on the carrier was 264 milligrams-Ti/gram-carrier.

Polymerization of Ethylene

In the same manner as in Example 1 except that the above obtained solid catalyst was used, ethylene was polymerized. As a results, 29.2 grams of polyethylene was obtained.

The catalyst activity was 60.9 kilograms of polyethylene per gram of titanium per hour, the melt index was 3.8, the bulk density was 0.24, and fine powders with grain sizes of 150μ or less constituted 8.0% of the total weight.

Comparative Example 2

Production of Solid Catalyst Carrying Deposited Titanium Component

In the same manner as in Example 1 except that only $MgCl_2.6\ C_2H_5OH$ was used as the carrier, a solid catalyst was produced. The amount of the titanium deposited on the carrier was 56 milligrams-Ti/gram-carrier.

Polymerization of Ethylene

In the same manner as in Example 1 except that the above obtained catalyst was used, ethylene was polymerized. As a result, 50.9 grams of polyethylene was obtained.

The catalyst activity was 106 kilograms of polyethylene per gram of titanium per hour, and the productivity was 5.9 kilograms-polyethylene/gram-carrier per hour. The melt index was 1.8, the bulk density was 0.25, and fine powders with grain sizes of 105μ or less constituted 28.5% of the total weight.

Reference Example 1

Production of Solid Catalyst Carrying Deposited Titanium Component

In the same manner as in Example 1 except that $Mg(OC_2H_5)_2$ and $MgCl_2.6\ C_2H_5OH$ were merely mixed and were not subjected to the heat-treatment to produce a solid product, the alochol treatment and the reaction with $TiCl_4$ were carried out to produce a solid catalyst. The amount of the titanium deposited on the carrier was 140 milligrams-Ti/gram-carrier, which was about 50% of that in Example 1.

Polymerization of Ethylene

In the same manner as in Example 1 except that the above solid catalyst was used, ethylene was polymerized. As a result, 100.3 grams of polyethylene was obtained.

The catalyst activity was 209 kilograms of polyethylene per gram of titanium per hour. However, the bulk density was 0.27 which was lower than that in Example 1, and fine powders with grain sizes of 105μ or less constituted 10% of the total weight. The melt index was 2.1.

Comparative Example 3

Production of Solid Catalyst Carrying Deposited Titanium Component

In the same manner as in Example 1 except that the magnesium compound was reacted with $TiCl_4$ without being subjected to the alcohol-treatment, a solid catalyst was produced. The amount of the titanium deposited on the carrier was 40 milligrams-Ti/gram -carrier.

Polymerization of Ethylene

In the same manner as in Example 1 except that the above solid catalyst was used, ethylene was polymerized. As a results, 69.6 grams of polyethylene was obtained.

The catalyst activity was 145 kilograms of polyethylene per gram of titanium per hour. However, the productivity was 5.7 kilograms-polyethylene/gram-carrier and the bulk density was very small, i.e., 0.22. The melt index was 1.2.

EXAMPLES 2 to 5

Solid catalysts were produced in the same manner as in Example 1 except that the type of alcohol to be used in the alcohol-treatment was changed as reported in Table 1. By using the thus obtained solid catalysts, ethylene was polymerized. The results are shown in Table 1.

From the results as shown in Table 1, it can be seen that all the alcohols except for ethanol provide high productivity.

TABLE 1

| Example No. | Alcohol | the amount of titanium deposited on the carrier (milligram-Ti/gram-carrier) | catalyst[1] activity (kilogram) | productivity[2] (kilogram/ gram-carrier) | bulk density (gram/cc) | the amount of[3] fine powder (%) |
|---|---|---|---|---|---|---|
| 2 | ethanol | 74 | 117 | 8.7 | 0.33 | 10.5 |
| 3 | t-butanol | 517 | 93 | 48.1 | 0.26 | 19.4 |
| 4 | n-octanol | 175 | 337 | 58.9 | 0.28 | 31.7 |
| 5 | cyclohexanol | 378 | 165 | 62.5 | 0.28 | 20.4 |

[1] per gram-Ti and hour
[2] per hour
[3] The grain size of fine powder is 105 μ or less.

EXAMPLES 6 TO 7

Solid catalyst were produced in the same manner as in Example 1 except that the amounts of $Mg(OC_2H_5)_2$ and $MgCl_2.6\ C_2H_5OH$ to be incorporated were changed as reported in Table 2. By using the thus obtained solid catalysts, ethylene was polymerized. The results are shown in Table 2.

From the results shown in Table 2, it can be seen that the catalyst performance is satisfactory.

TABLE 2

| Example No. | Mg(OC$_2$H$_5$)$_2$/ MgCl$_2$ · 6C$_2$H$_5$OH (molar ratio) | the amount of titanium deposited on the carrier (milligram-Ti/ gram-carrier) | catalyst*[1] activity (kilogram) | productivity*[2] (kilogram/ gram-carrier) | bulk density (gram/cc) | the amount*[3] of fine powder (%) |
|---|---|---|---|---|---|---|
| 6 | 3/1 | 290 | 128 | 37.1 | 0.28 | 7.8 |
| 7 | 1/3 | 320 | 137 | 43.8 | 0.27 | 15.3 |

*[1] per gram-Ti and hour
*[2] per hour
*[3] The grain size of fine powder is 105 μ or less.

EXAMPLE 8

Production of Solid Catalyst Carrying Deposited Titanium Component

To a part of the hexane slurry of the solid catalyst as obtained in Example 1 was added at 0° C. diethylaluminum monochloride so that Al/Ti (molar ratio) is 1.5. They were reacted at 40° C. for 1 hour, and the reaction product was washed with hexane twice to obtain a solid catalyst. The amount of the titanium deposited on the carrier was 275 milligrams-Ti/gram-carrier.

Polymerization of Ethylene

In the same manner as in Example 1 except that the above obtained solid catalyst was used, ethylene was polymerized. As a result, 123 grams of white polyethylene was obtained.

The catalyst activity was 256 kilograms of polyethylene per gram of titanium per hour, the productivity was 70.4 kilograms-polyethylene/gram-carrier per hour, and the bulk density was 0.34.

EXAMPLE 9

By using the catalyst as obtained in Example 8, propylene was polymerized.

In a 1-liter autoclave was introduced 400 milliliters of n-heptane. A mixture of 2 millimoles of triethylaluminum and 0.1 millimole as Ti of the solid catalyst was added thereto, and the temperature was raised. When it reached 70° C., propylene was introduced therein until the pressure reached 7 kg/cm$^2$.Gage. By continuously incorporating propylene, the polymerization of propylene was carried out at 70° C. for 2 hours. The polypropylene product was recovered by purging the unreacted gas. Thus, 131 grams of polypropylene was obtained. This polypropylene was extracted with boiling heptane for 6 hours, and the extraction residue was 60.2%.

EXAMPLE 10

In the same manner as in Example 9 except that 0.15 millimol of methyl p-toluylate was added to the reaction system, propylene was polymerized. As a result, 57.6 grams of polypropylene was obtained. This polypropylene was extracted with boiling heptane and the extraction residue was 91.8%.

We claim:

1. A process for producing an improved titanium catalyst for use in the polymerization of olefins comprising heating a magnesium dialkoxide and an alcohol adduct of a magnesium dihalide at a temperature of from about 100° C. to 200° C. under reduced pressure to form a solid product, treating said solid product with an alcohol at a temperature of between 0° C. and 200° C. for between about 5 minutes and 5 hours to form an alcohol treated solid product, and then reacting said alcohol treated solid product with a titanium compound containing at least on halogen atom directly bonded to a titanium atom at a temperature of from about 0° C. to 200° C. for a period of from about 5 minutes to about 10 hours.

2. The process of claim 1 wherein
said magnesium dialkoxide has the formula Mg(OR$^1$)$_2$ wherein R$^1$ is at least one group selected from the group consisting of alkyls, cycloalkyls and arylalkyls, each containing 1 to 20 carbon atoms;
said alcohol adduct of the magnesium dihalide having the formula MgX$_2$.nR$^2$OH wherein X is a halogen atom, R$^2$OH is a straight or branched chain aliphatic or alicyclic alcohol containing 1 to 10 carbon atoms, and n is from 0.1 to 10;
said alcohol with which said solid product is treated is at least one alcohol selected from straight and branched chain aliphatic and alicyclic alcohols containing from 1 to 10 carbon atoms;
said halogen-containing titanium compound has the formula Ti(OR$^3$)$_{4-m}$X$_m$ wherein X is a halogen atom, R$^3$ is an alkyl group containing 1 to 10 carbon atoms, and m is from 1 to 4; and
the molar ratio of said magnesium dialkoxide to said alcohol adduct of a magnesium dihalide is from 1:4 to 4:1; said alcohol which is used to treat said solid product is in an amount of from 0:1 mole to 10 moles per mole of magnesium in said solid product; and said halogen-containing titanium compound is in an amount of from 0.5 mole to 10 moles per mole of magnesium.

3. The process of claim 2 wherein said magnesium dialkoxide and said alcohol adduct of a magnesium dihalide are heated at a temperature of from about 100° C. to 200° C. under reduced pressure to form said solid product; and said solid product is treated with said alcohol at a temperature of between about 20° C. and 100° C. for between about 20 minutes and 3 hours; and wherein said halogen-containing titanium compound is reacted with said alcohol treated solid product at a temperature of from about 50° C. to 150° C. for a period of from about 30 minutes to about 5 hours.

4. The process of claim 1 or 3 wherein said alcohol treated solid product which has been reacted with said halogen-containing titanium compound is reacted with an organoaluminum compound of the formula AlR$_n$X$_{3-n}$ wherein R is an alkyl group, X is a halogen atom, and n is 1 or 2.

5. The improved titanium catalyst for use in the polymerization of olefins produced by the process of any one of claims 1, 2, or 3.

6. The improved titanium catalyst for use in the polymerization of olefins produced by the process of claim 4.

* * * * *

UNITED STATES PATENT AND TRADEMARK OFFICE
CERTIFICATE OF CORRECTION

PATENT NO. : 4,308,170

DATED : December 29, 1981

INVENTOR(S) : SHIGEYOSHI MIZOGAMI et al

It is certified that error appears in the above—identified patent and that said Letters Patent is hereby corrected as shown below:

Column 8, line 40: replace "0:1" with --0.1--.

Signed and Sealed this

Fifteenth Day of June 1982

[SEAL]

Attest:

GERALD J. MOSSINGHOFF

Attesting Officer

Commissioner of Patents and Trademarks